United States Patent [19]

Salvagnini

[11] Patent Number: 5,046,021

[45] Date of Patent: Sep. 3, 1991

[54] ROBOTIC ASSEMBLY AND DISASSEMBLY STATION FOR REMOVABLY CLAMPING A SUCCESSION OF WORKPIECES TO A SUCCESSION OF SUPPORT PALLETS

[75] Inventor: Guido Salvagnini, Sarego, Italy

[73] Assignee: Salvagnini Transferica S.P.A., Sarego, Italy

[21] Appl. No.: 454,421

[22] Filed: Dec. 21, 1989

[30] Foreign Application Priority Data

Dec. 22, 1988 [IT] Italy .............................. 23058 A/88

[51] Int. Cl.⁵ .......................................... B23Q 3/157
[52] U.S. Cl. ..................................... 364/513; 29/568; 901/5
[58] Field of Search ........... 364/513, 527, 578, 474.01, 364/474.02; 29/568; 901/5, 6

[56] References Cited

U.S. PATENT DOCUMENTS

| | | | |
|---|---|---|---|
| 3,884,363 | 5/1975 | Ajlouny ................................ 901/5 |
| 3,958,740 | 5/1976 | Dixon ..................................... 901/6 |
| 4,260,941 | 4/1981 | Engelberger et al. ......... 318/568.15 |
| 4,321,679 | 3/1982 | Fujie et al. ........................... 364/513 |
| 4,577,284 | 3/1986 | Christy et al. ....................... 364/513 |
| 4,694,232 | 9/1987 | Suzuki et al. ....................... 364/513 |
| 4,844,678 | 7/1989 | Schenk ................................. 29/568 |
| 4,856,178 | 8/1989 | Salvagnini ............................ 29/568 |

Primary Examiner—Allen R. MacDonald
Assistant Examiner—George Davis
Attorney, Agent, or Firm—Cushman, Darby & Cushman

[57] ABSTRACT

The station comprises a revolving table for receiving, positioning and clamping in an operating position a pallet of the type provided with adjustable anchoring elements for components of clamping fixtures, a magazine for modular components of clamping fixtures and a robot capable of executing adjustment functions of the anchoring elements of pallet, of the clamping and transfer of the modular components and of the application to and separation from the components themselves with respect to anchoring elements of pallet. There is provided a control centre with a computer, whereby just one operator may automatically and repetitively execute the work for the entire station.

9 Claims, 14 Drawing Sheets

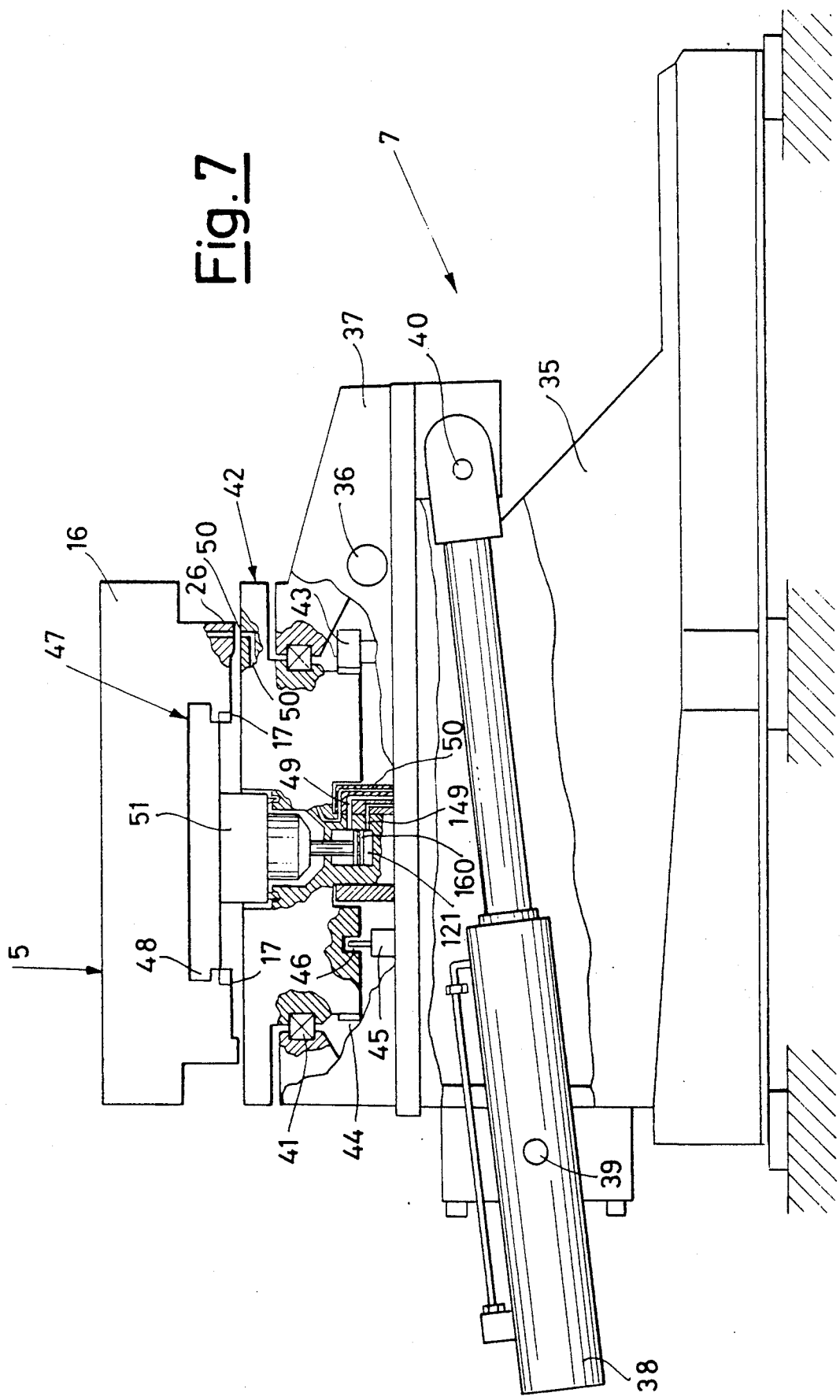

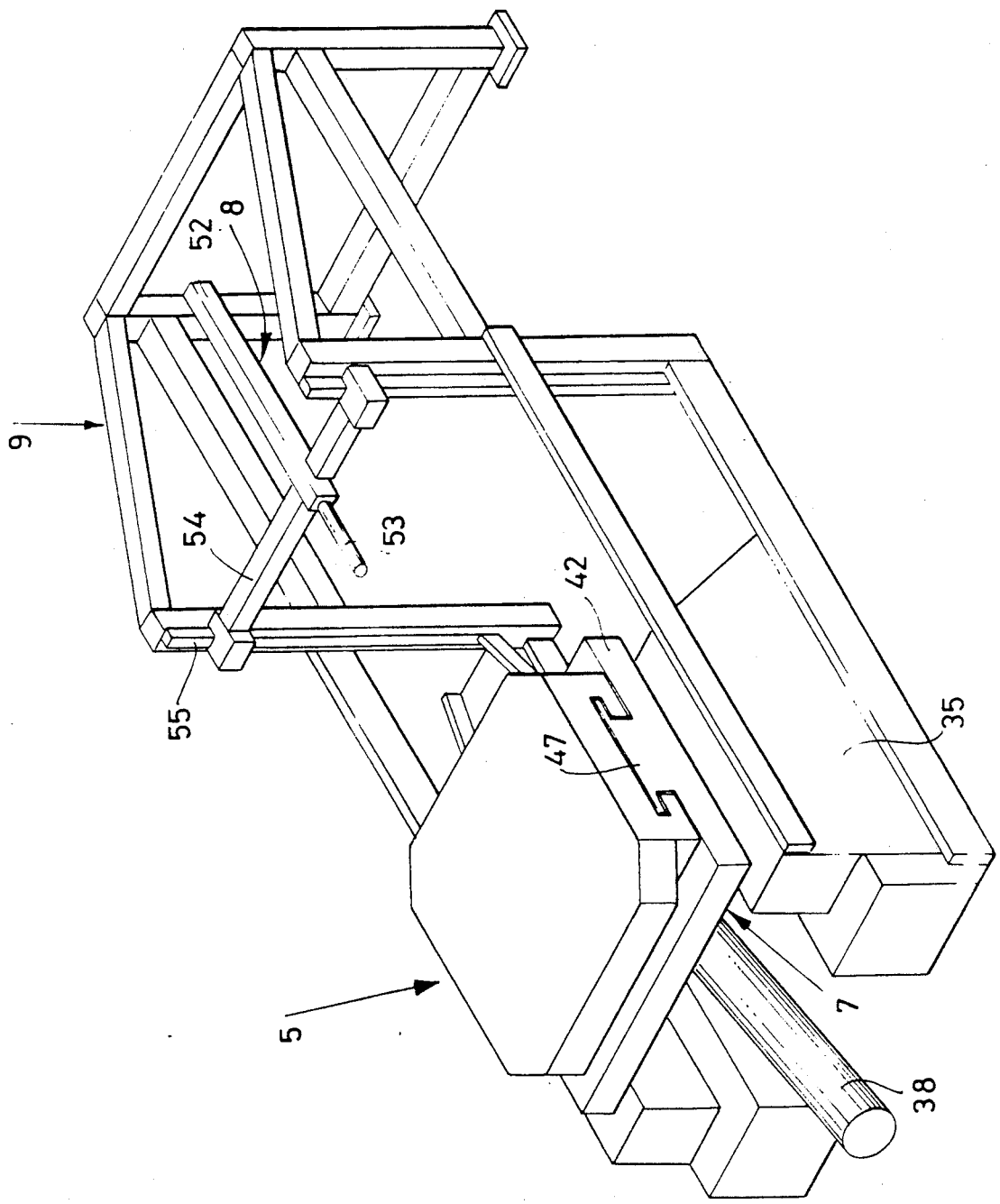

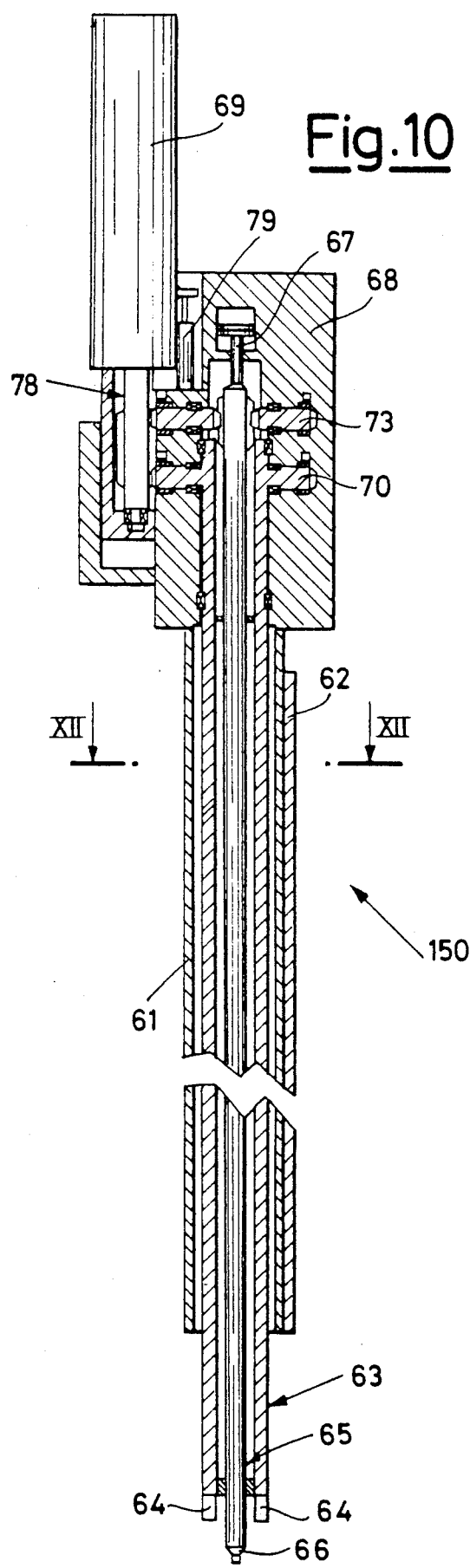
Fig.10
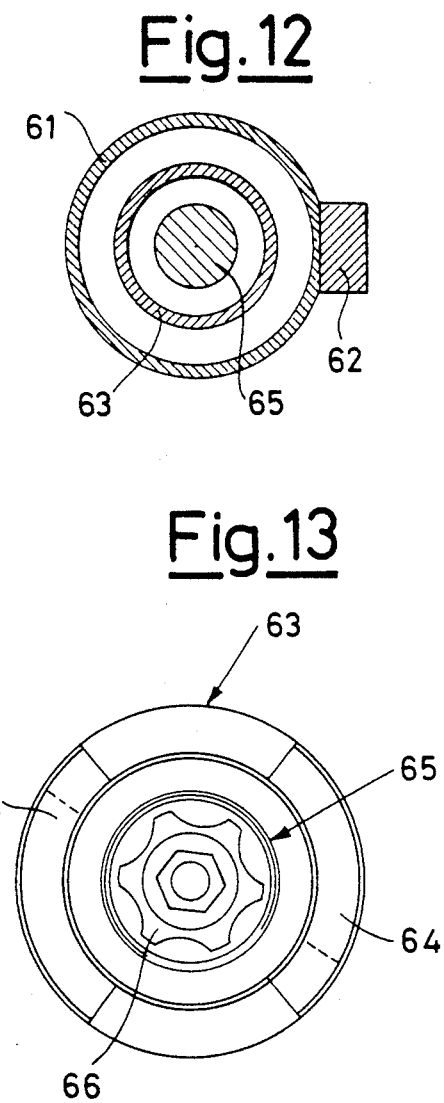
Fig.12
Fig.13
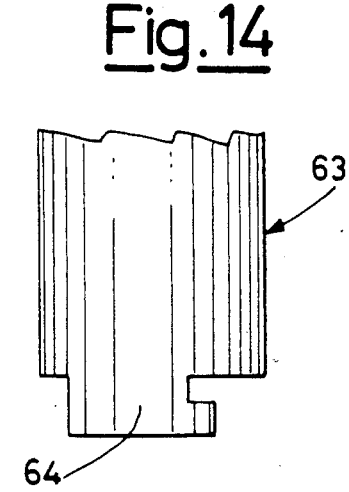
Fig.14

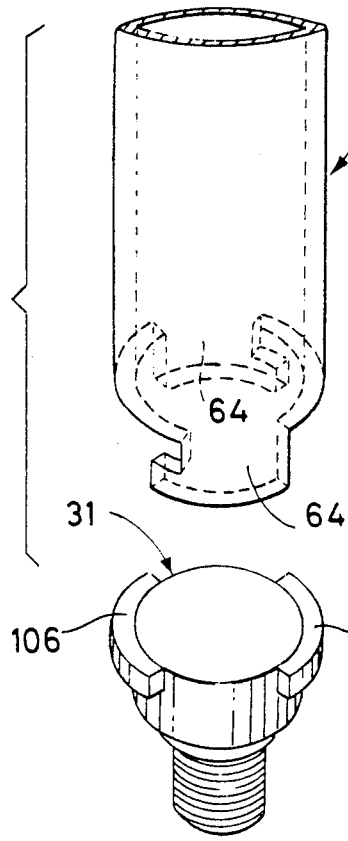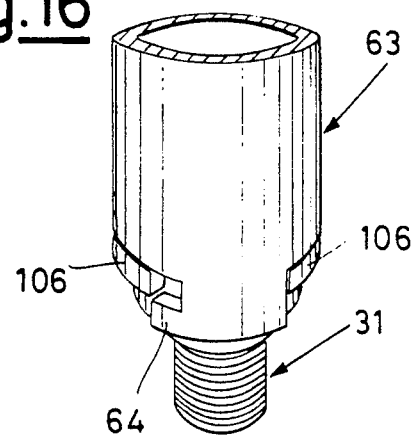
Fig.16
Fig.15
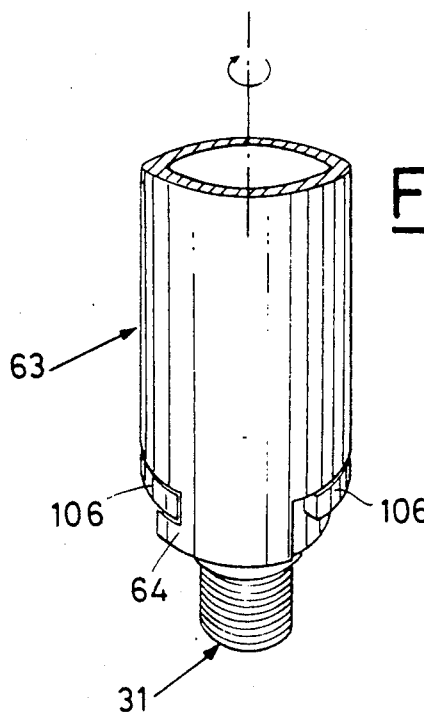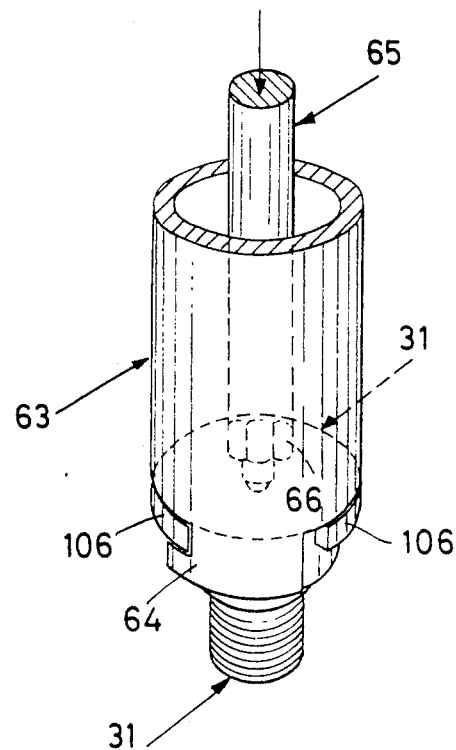
Fig.17
Fig.18

ROBOTIC ASSEMBLY AND DISASSEMBLY STATION FOR REMOVABLY CLAMPING A SUCCESSION OF WORKPIECES TO A SUCCESSION OF SUPPORT PALLETS

BACKGROUND OF THE INVENTION

The present invention relates to an assembly and disassembly station having an automatic programmable repetitive cycle for piece-clamping fixtures on supporting pallets.

In the world of machine tools, "pallets" refers to plates on which pieces to be machined are clamped using suitable fixtures, and are moved from one or more holding stations to one or more machining, washing or measurement stations.

The clamping fixtures utilized for these pallets are of the most diverse types and must be designed on a case by case basis in relation to the shape and size of the piece to be machined, to the features of the machine tool, to the machining accuracy required and to the quantity of pieces to be machined.

Many attempts have been made to avoid having each clamping fixture redesigned from scratch and constructed specially.

One of these is represented by the pallet described in the Italian patent application No. 22932 A/87 dated Dec. 10, 1987, which provides for a plurality of anchoring elements adjustable in height and in angular orientation, with which it is possible to use modular components for the formation of the clamping fixture required on each occasion.

In this way, the number of different components in stock may be substantially reduced, and the necessity is avoided of having to design specific components for the individual pieces to be machined.

However, certain drawbacks remain, of which the main one's may be summarized as follows:

the different operations for adjusting the pallet's anchoring elements, and for assemblying and disassemblying the clamping fixtures are still executed by hand;

the cost of reassembly of a fixture which has already been used and disassembled is equal to that of first assembly;

repetitive operations in the selection of the fixture's modular components, such as the composition of the lengths, the calculation of the clamping forces, the calculation of the deformations of the components, must be executed anew on each occasion.

SUMMARY OF THE INVENTION

An object of the present invention is to accomplish an assembly and disassembly station for piece-clamping fixtures on supporting pallets, which eliminates all the above-mentioned drawbacks, making it possible to execute all the required operations within the scope of a programmable mechanized cycle, which may be repeated automatically on each occasion, as desired.

According to the invention, this object is attained with an assembly and disassembly station for use with a pallet of the type provided with adjustable anchoring elements for components of clamping fixtures and is characterized in that it comprises a revolving table suitable for positioning and clamping an arriving pallet, a magazine for modular components of clamping fixtures, a robot operating between the revolving table and the magazine and provided with grasping organs for the adjustment of the anchoring elements of the pallet, for the grasping and transfer of said clamping fixture components and for their application to and separation from the anchoring elements, and a control centre with a computer controllable by a single operator.

Preferably, the assembly and disassembly station according to the invention also comprises a device for testing the fastness of the clamping fixture, also under the control of the computer-equipped control centre.

It should be clear that the assembly and disassembly station according to the invention, by being completely mechanized, automated, repetitive, programmable and controllable by a single operator, offers great advantages with respect to current procedures, which are prevalently manual and require the intervention of several people.

BRIEF DESCRIPTION OF THE DRAWINGS

One possible embodiment of the present station is illustrated for greater clarity, but with no limiting intent, in the attached drawings, wherein:

FIG. 7 shows in a partially sectioned side view a revolving table used in the station of FIG. 1 for positioning and clamping the pallet of FIG. 2;

FIG. 8 shows a perspective view of the assembly of the table of FIG. 7 and of an associated device for testing the fastness of the clamping fixture, which may be utilized in the station of FIG. 1;

FIG. 10 shows the operating device of the robot in an axial cross-sectional view;

FIG. 12 shows the robot in an enlarged cross-sectional view taken along the line XII—XII of FIG. 10;

FIG. 13 shows the grasping organs of the robot, seen in a plan view taken from below on an enlarged scale;

FIG. 14 shows an enlarged detail of the lower extremity of one of the grasping organs;

FIGS. 15 to 18 show as an example, in respective perspective views, the manner of operation of the robot's grasping organs on the closing plug of the pallet's anchoring elements;

DETAILED DESCRIPTION

Figure 1:
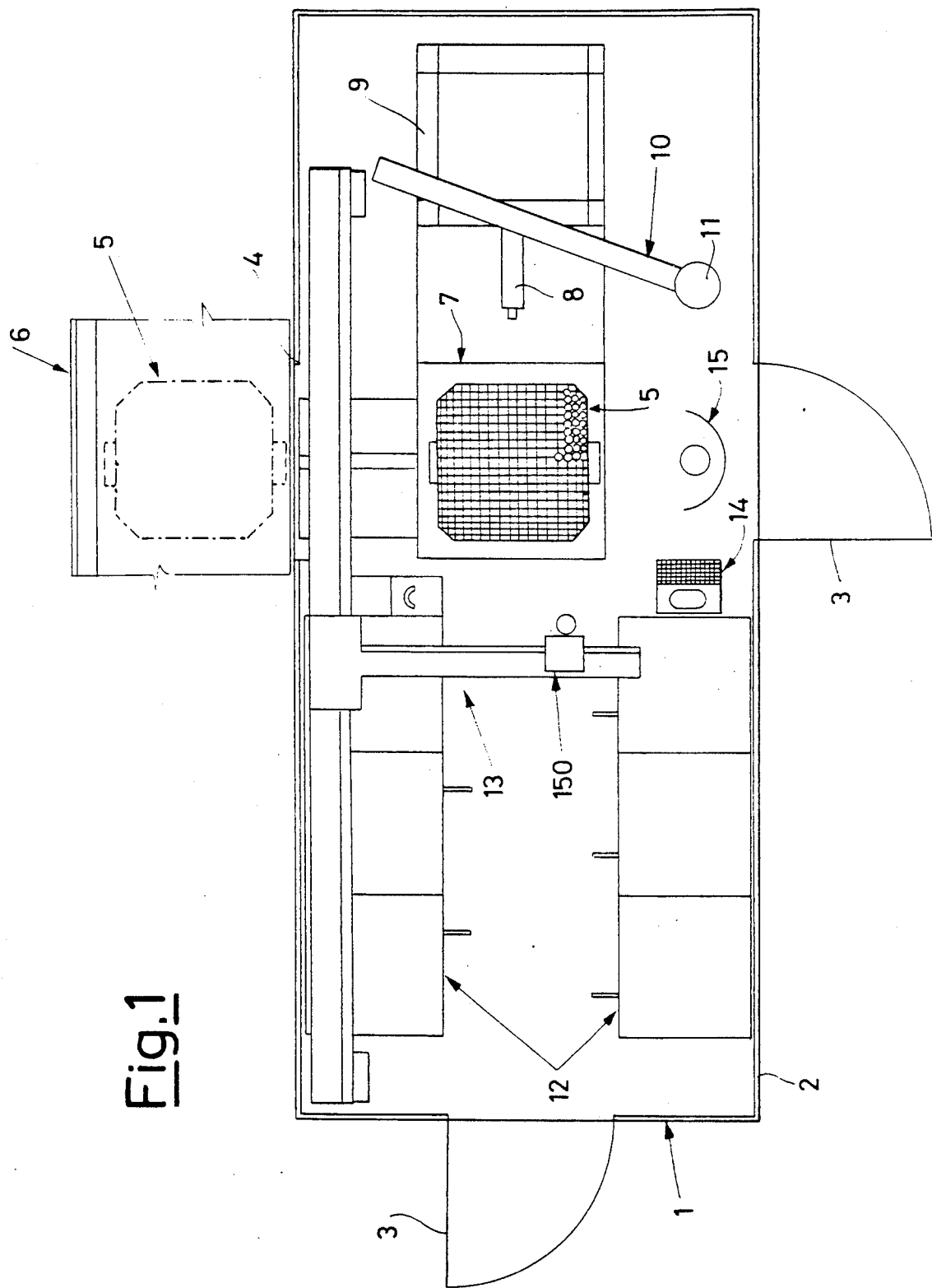
FIG. 1 shows the overall schematic plan view of an assembly and disassembly station according to the present invention.

There is represented schematically in FIG. 1 an assembly and disassembly station according to the invention, which is accomplished within an operating space 1 defined by sound-proof walls 2, which insulate it acoustically from the outside and which, due to a slight pressurization, protect it from machining dust. Access gates for the operators are indicated by the numeral 3 and air-tight entry and exit door by the numeral 4, operated automatically, for a pallet 5 fed by a conveyancing system 6 to which it may be returned at the end of the operation.

Inside the operating space 1, there is arranged a revolving table 7 for receiving, positioning and clamping the pallet 5 in an operating position for performing, as occasion demands, the assembly or disassembly of a clamping fixture.

Near the revolving table 7, there is arranged a testing device 8 mounted on a support 9, whose task it is to test the fastness of the piece at the end of the clamping fixture's assembly operation.

On the same side, there is also provided a jib crane 10 rotatable on pivot 11, used for raising a sample piece to be placed on the pallet as a reference during the first assembly of the clamping fixture.

On the opposite side, there is on the other hand provided a caisson-type magazine 12, for the modular components of the clamping fixtures.

Alongside and transversally to the magazine 12 a four-axis Cartesian robot may be moved, suitable for executing a multiplicity of functions which will be explained later.

Lastly, there is provided a control centre 14, equipped with a computer, controlled by an operator 15.

An example of a pallet 5 suitable for the assembly and disassembly station of FIG. 1, and in compliance with the above mentioned Italian patent application No. 22932 A/87, is shown in FIGS. 2 to 5, comprising a base 16 provided with standardized sliding guides 17, which allow it to engage with usual complementary guides of the conveyancing system 6, as well as with, as will be seen later, corresponding guides of the revolving table 7.

In the illustrated example, pallet 5 is provided with a supporting face 18 for the piece to be machined and with the corresponding clamping fixture, but in more general terms it may also have two or four of them.

Whatever the number of the supporting faces, each of the supporting faces is equipped with a plurality of adjustable anchoring elements 19 for modular components of the clamping fixture.

Figure 4:
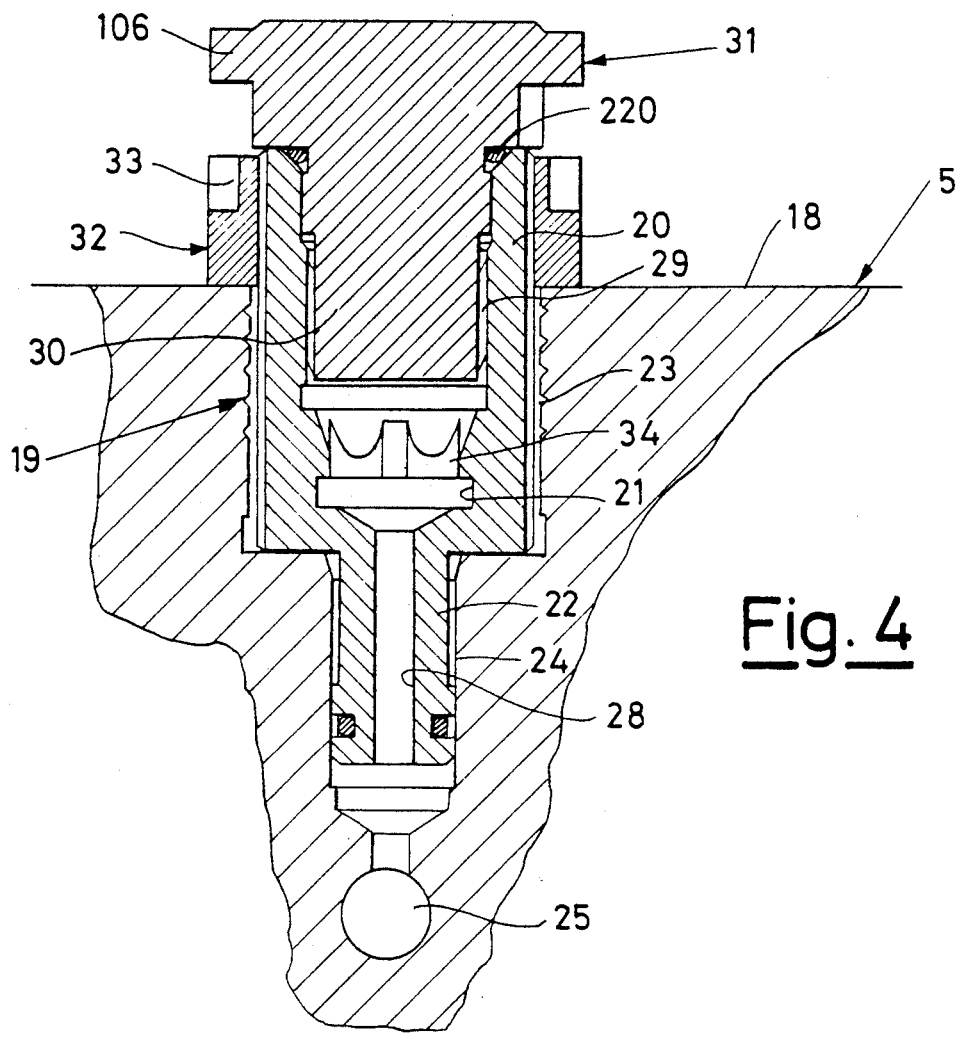
FIG. 4 shows the enlarged detail, in an axial cross-sectional view, of an anchoring elements included in the above pallet, together with a corresponding closing plug.
Figure 5:
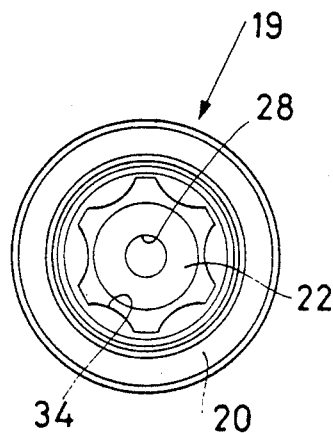
FIG. 5 shows the anchoring element of FIG. 4 in top plan view.

As shown in FIGS. 4 and 5, each anchoring element 19 has a substantially cylindrical casing 20, threaded externally, from which there extends at its lower extremity an appendix 22, which is also cylindrical and has a smaller diameter.

In order to receive the anchoring elements 19, the supporting face 18 of pallet 5 has a plurality of cylindrical internally threaded holes 23 whose diameter corresponds to that of the casing 20 of the anchoring elements, and from the holes 23 there extend at their lower end respective cylindrical extensions 24 whose diameter corresponds to that of appendices 22 of the anchoring elements.

Figure 2:
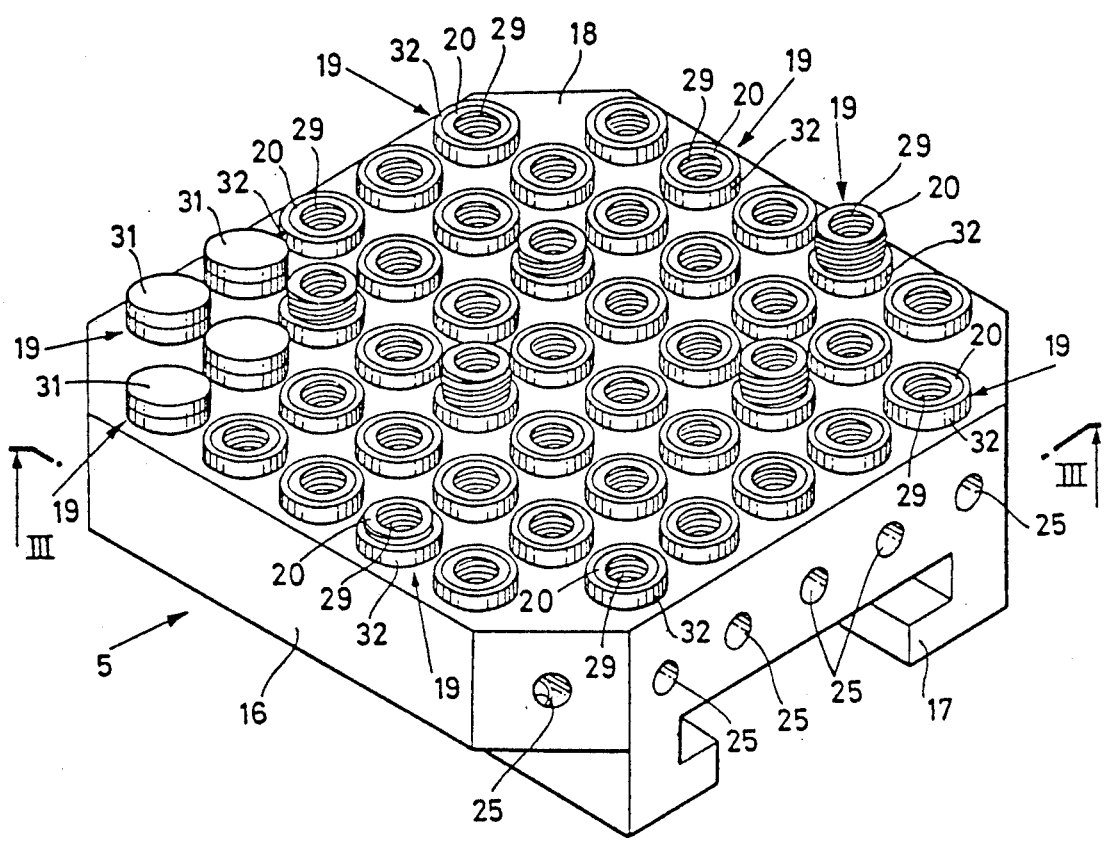
FIG. 2 shows a perspective view of an example of a pallet having adjustable anchoring elements, which may be used in connection with the assembly and disassembly station according to FIG. 1.
Figure 3:
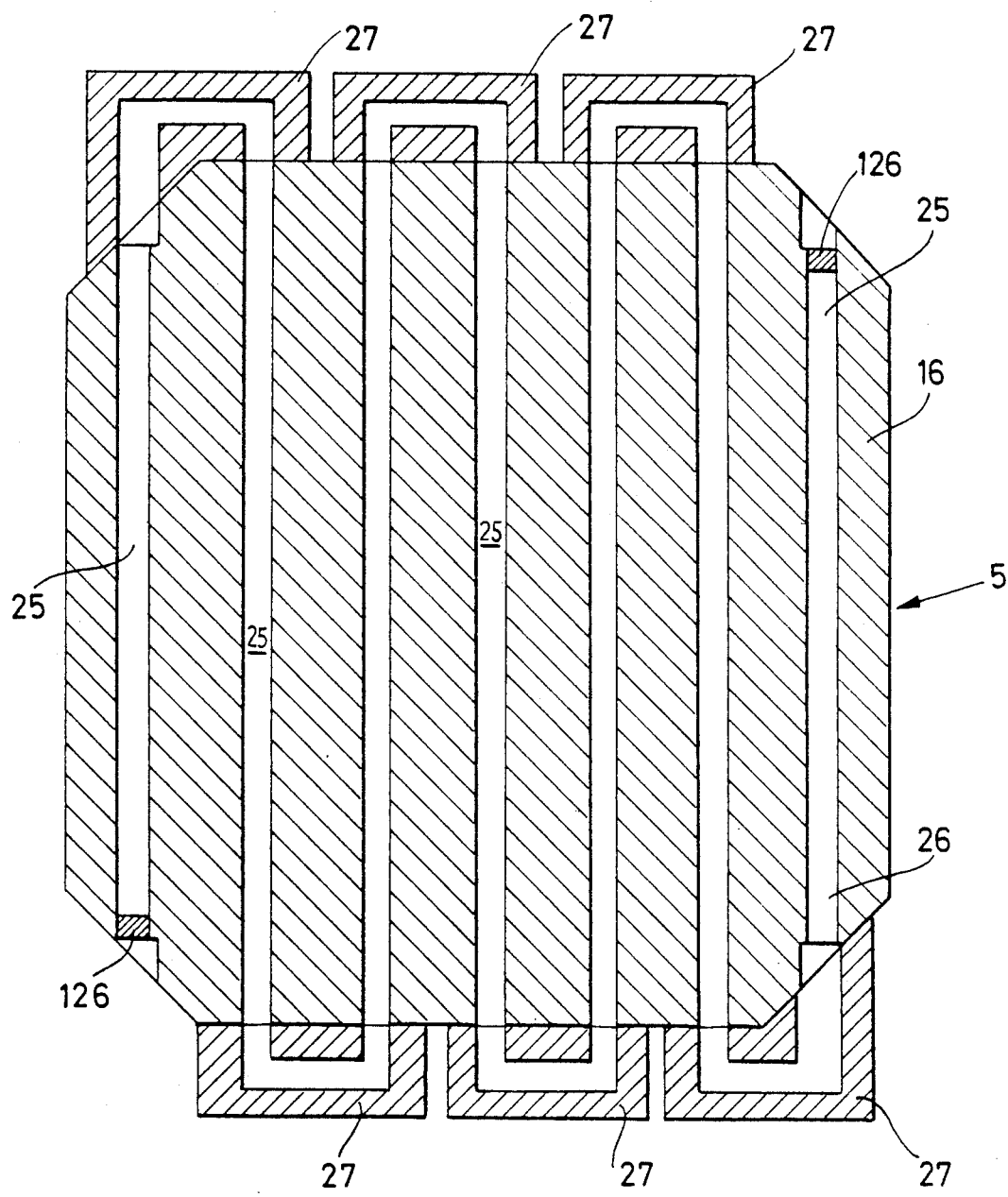
FIG. 3 shows the pallet of FIG. 2 in a horizontal cross-sectional view taken along the line III—III of FIG. 2.

The lower extremity of each hole extension 24 communicates with a respective channel 25, forming part of a network of horizontal channels within the base 16, which is illustrated in FIG. 3. Such channel network 25 communicates with a fluid feed hole 26 accessible from the lower face of base 16. The conformation of the above network, and thus the selection of the holes 23, 24 to be supplied with fluid, is variable in relation to the position of plugs 126 and of channelled plates 27 (not shown in FIG. 2), which close and connect, respectively, selected extremities accessible from the outside of the different channels 25.

Returning to FIGS. 4 and 5, each hole 24 communicates with the outside by means of internal axial aligned passages 28 and 29 of the respective anchoring element 19.

The upper passage 29 is internally and partially threaded, so that it may engage with a corresponding cylindrical tang 30 of a closing plug 31 having a gasket 220 and a head provided with radial protuberances 106 having the shape of a circular sector (FIG. 6), and terminates at its lower end with a hollow 34 having a six-cusp horizontal section with an underlying enlarged cylindrical support 21.

Lastly, FIG. 4 shows a clamping ring nut 32, which may be screwed onto the upper casing 20 of the anchoring element 19 outside the hole 23. The ring nut 32 is provided with radial notches 33 for the purpose of rotating the ring nut itself.

An example of a revolving table 7 suitable for positioning and clamping the pallet of FIGS. 2 to 5 is illustrated in FIG. 7. The table 7 comprises a base pedestal 35, on which there is hinged at 36 an inclinable part 37 operated (for instance between 0° and 90°) by a hydraulic cylinder 38 hinged at 39 on pedestal 35 and at 40 on inclinable part 37. The inclinable part 37 supports, by means of bearings 41, a rotatable part 42, which may be made to rotate by means of a pinion 43 engaged with a toothed crown 44 and may be clamped in predetermined angular positions (for instance, 0°, 90°, 180°, 270°) by means of a bolt 45 which may be inserted in circumferentially spaced hollows 46 of the rotatable part 42. An upper plate 47, provided with guides 48 complementary with guides 17 of pallet 5, has a lower tang 51 which engages with the rotatable part 42 in a vertically slidable way so as to operate the clamping of the pallet 5 above it. Clamping is executed by means of oil or other fluid suitably fed through channels 49 and 149 to a hydraulic cylinder 121 in which a piston 160 slides while constrained to tang 51. A further channel 50 feeds oil or other fluid to the upper hole 26 of pallet 5.

As indicated above, a device 8 for testing the fastness of the clamping fixture is connected to the revolving table 7. The assembly thus constituted is illustrated in FIG. 8, wherein the testing device is shown constituted by an oleodynamic cylinder 52 with stem 53 suitable for pushing with force on the part mounted on pallet 5. Cylinder 52 is mounted on a supporting carriage 9 so that it may be displaced horizontally along a traverse 54 and vertically along guides 55.

Figure 9:
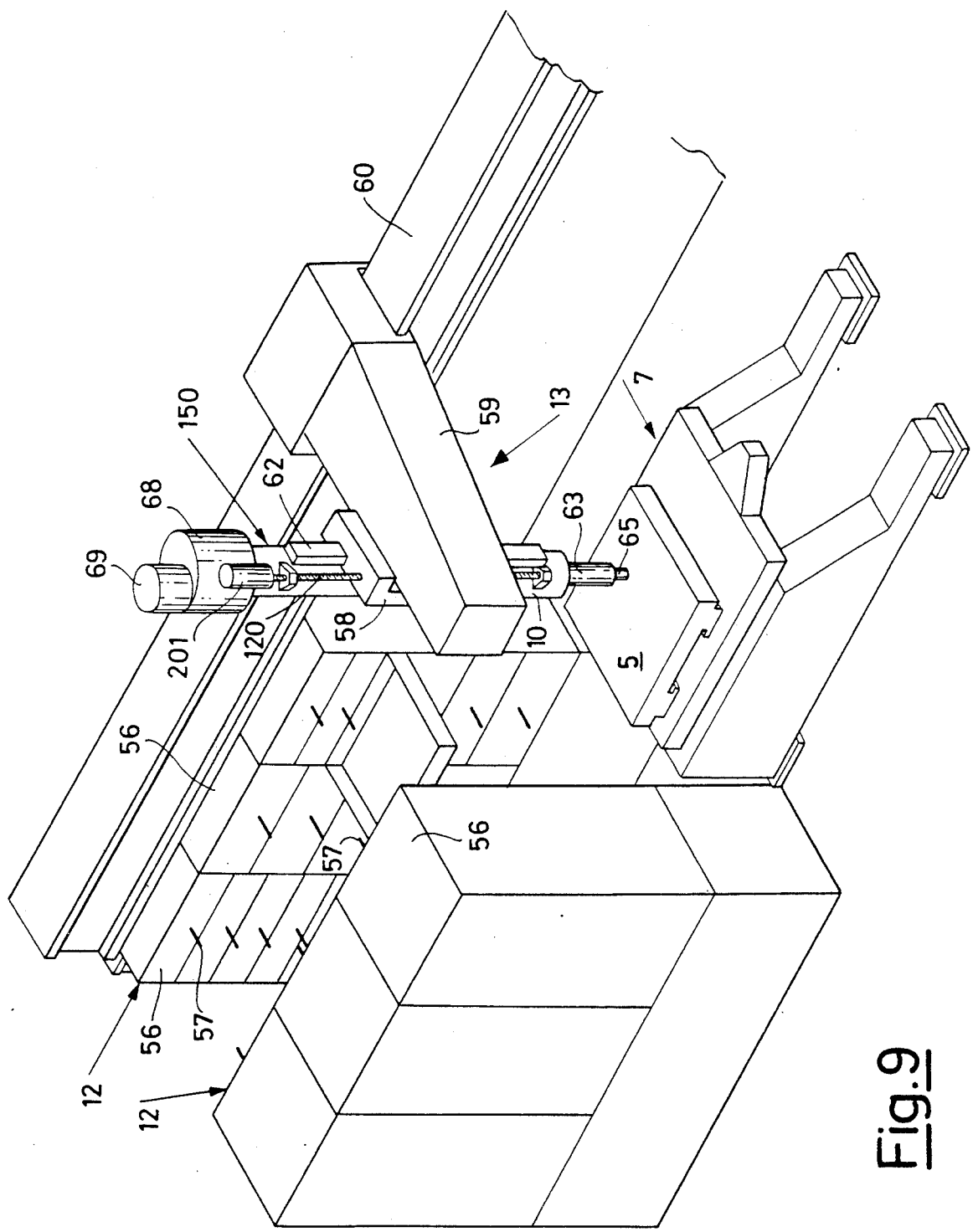
FIG. 9 shows a perspective view of the assembly of a magazine for components of clamping fixtures and of a robot for the grasping, transfer and application of said components and for the adjustment of the anchoring elements, with which the station of FIG. 1 may be equipped.

An example of a magazine 12 for modular components of clamping devices is shown in FIG. 9 and is constituted by two rows of caissons with sliding drawers 56 provided with handles 57.

With the two rows of drawers 56, the robot 13 co-operates and includes an operating device 150 mounted in a vertically slidable way of a support 58, slidable horizontally along a traverse 59 in turn horizontally mobile along a guide 60.

Figure 6:
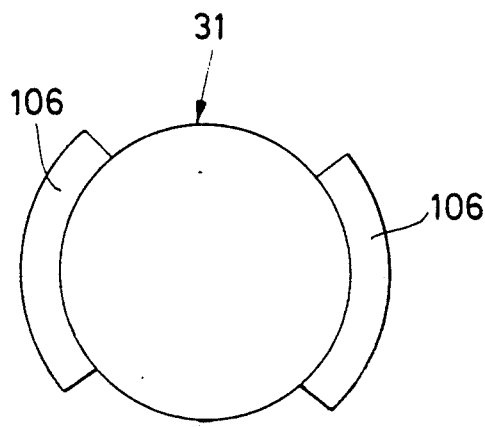
FIG. 6 shows the closing plug of FIG. 4 in top plan view.
Figure 11:
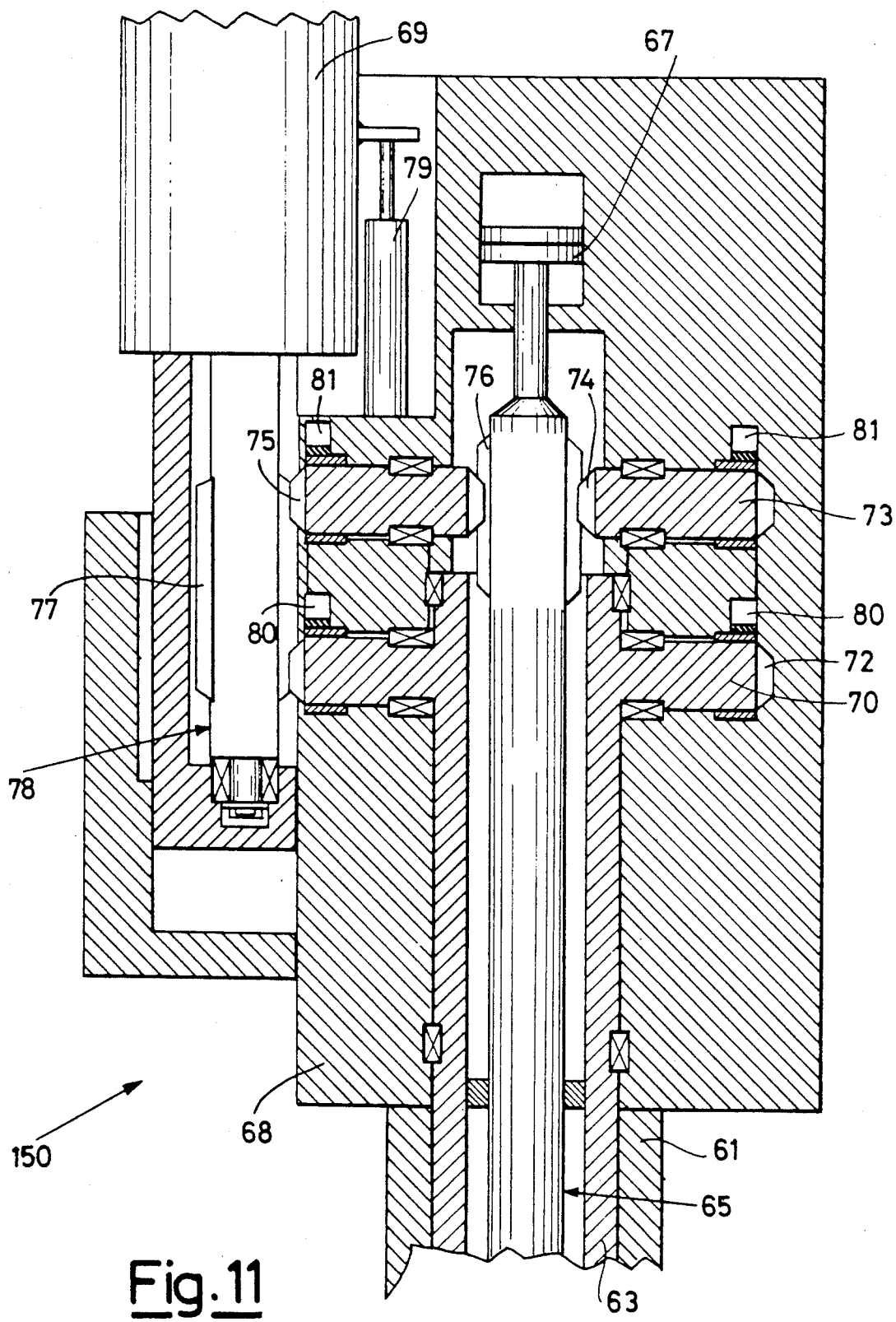
FIG. 11 shows an enlarged detail of the robot, again in an axial cross-sectional view.

As better illustrated in FIGS. 10 to 14, the operating device 150 comprises a tubular casing 61 made integral with a vertical bar 62 slidable in support 58 under the control of a vertical adjustment screw 120 operated by a coaxial motor 201 (FIG. 9). Inside the tubular casing 61, coaxially with it (FIGS. 10 and 12), there is rotatably housed a tubular-shaped grasping organ 63, which terminates at its lower end with a pair of symmetrical protruding teeth 64 (FIGS. 10, 13 and 14) which may be engaged with the radial notches 33 of the clamping ring nuts 32 of anchoring elements 19 of pallet 5 (FIG. 4) and with the radial protuberances 106 of plugs 31 (FIGS. 4 and 6). Inside the above tubular-shaped grasping organ 63, coaxially with it, there is, in turn, rotatably housed a finger-type grasping organ 65, which terminates at its lower end with an extremity 66 having a horizontal six-cusp star-shaped cross-section (FIG. 13), suitable for engaging with the six-cusp star-shaped hollow 34 of anchoring elements 19 of pallet 5 (FIG. 5). The finger-type grasping organ 65 is also vertically slidable inside the tubular-shaped grasping organ 63 under the control of a small oleodynamic piston 67 located above it (FIGS. 10 and 11).

The two grasping organs 63 and 65 are made to rotate by an operating mechanism included in an upper head 68 (FIGS. 9, 10 and 11) and controlled by an electric motor 69. More accurately, the operating mechanism comprises a first toothed wheel 70 integral with the upper extremity of the tubular-shaped grasping organ 63 and provided with external teeth 72, as well as a freely-rotatable second toothed wheel 73 provided with internal teeth 74 and with external teeth 75. With the internal teeth 74 there engages an external set of teeth 76 of the grasping organ 65, while with the one and/or other of the external teeth 72 and 75 there is engageable an external set of teeth 77 of a rotor 78 made to rotate by electric motor 69 and susceptible to be made to slide axially together with the same motor 69 under the control of a three-position hydraulic cylinder 79. Both the extremities of the teeth 72, 75, 77 are bevelled to facilitate engagement. Two or more pairs of small hydraulic cylinders 80, 81 are located near the toothed wheels 70 and 73 to lock them in any angular position desired.

It appears evident that, according to the axial position of the rotor 78, electric motor 69 is put into a position of rotating one or the other or both grasping organs 63 and 65, both in one direction and in the other, while the grasping organ which may not have been made to rotate is held clamped by the small cylinders 80 or 81. As indicated above, grasping organ 65 can also translate axially under the control of the small piston 67.

FIGS. 15 to 18 show, as an example, the method of operation of the grasping organs 63 and 65 for the withdrawal of a plug 31 from an anchoring element 19. With the tubular-shaped grasping organ 63 suitable oriented at an angle, the entire operating device 150 is lowered, due to the screw 120, so that the teeth 64 are made to pass between one and the other of protuberances 106 of plug 31. Once the lowered position of FIG. 16 has been attained, the grasping organ 63 is made to rotate by motor 69 by means of rotor 78 (suitably lowered) and toothed wheel 70 (while toothed wheel 73 remains disengaged from rotor 78 and is locked by the small cylinders 81), so as to engage its teeth 64 with the protuberances 106 (FIG. 17) and then cause the unscrewing of plug 31. By means of small piston 67, the finger-type grasping organ 65 is subsequently lowered until it presses with its lower extremity 66 against the top of plug 31 (FIG. 18). The plug 31 is now held firmly and accurately by the two grasping organs 63 and 65 and may be transferred as required.

In FIGS. 19 to 24 there are shown some examples of modular components of clamping fixtures which robot 13 of FIGS. 9 to 14 is in a position of withdrawing from sliding drawers 56 of magazines 12, transferring and applying them to selected anchoring elements 19 of pallet 5, and vice versa.

Figure 19:
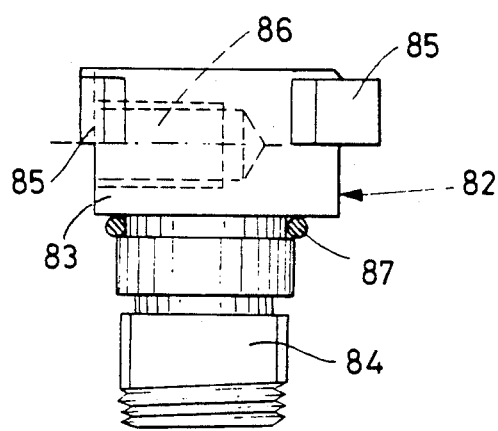
FIGS. 19 and 20 show a modular component of a clamping fixture, in a side view and in a plan view taken from above, respectively.
Figure 20:
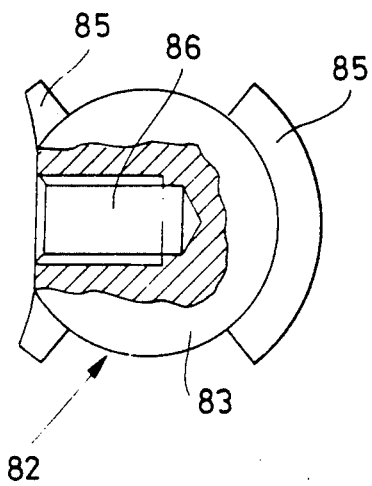

FIGS. 19 and 20 illustrate a modular component 82 for positioning and transversal alignment, which is formed by a solid cylindrical casing 83 provided with a lower threaded tang 84 having a diameter suitable for threading in the internal hole 29 of an anchoring element 19 of pallet 5 and with upper radial protuberances 85 which may engage with teeth 64 of tubular-shaped grasping organ 63 of robot 13 in the same way as protuberances 106 of plugs 31. In the upper part of the component there is also provided a threaded radial hole 86, into which a commonly-found cap may be screwed down. An annular gasket 87 ensures hydraulic tightness when component 82 is applied to an anchoring element 19 of pallet 5.

Figure 21:
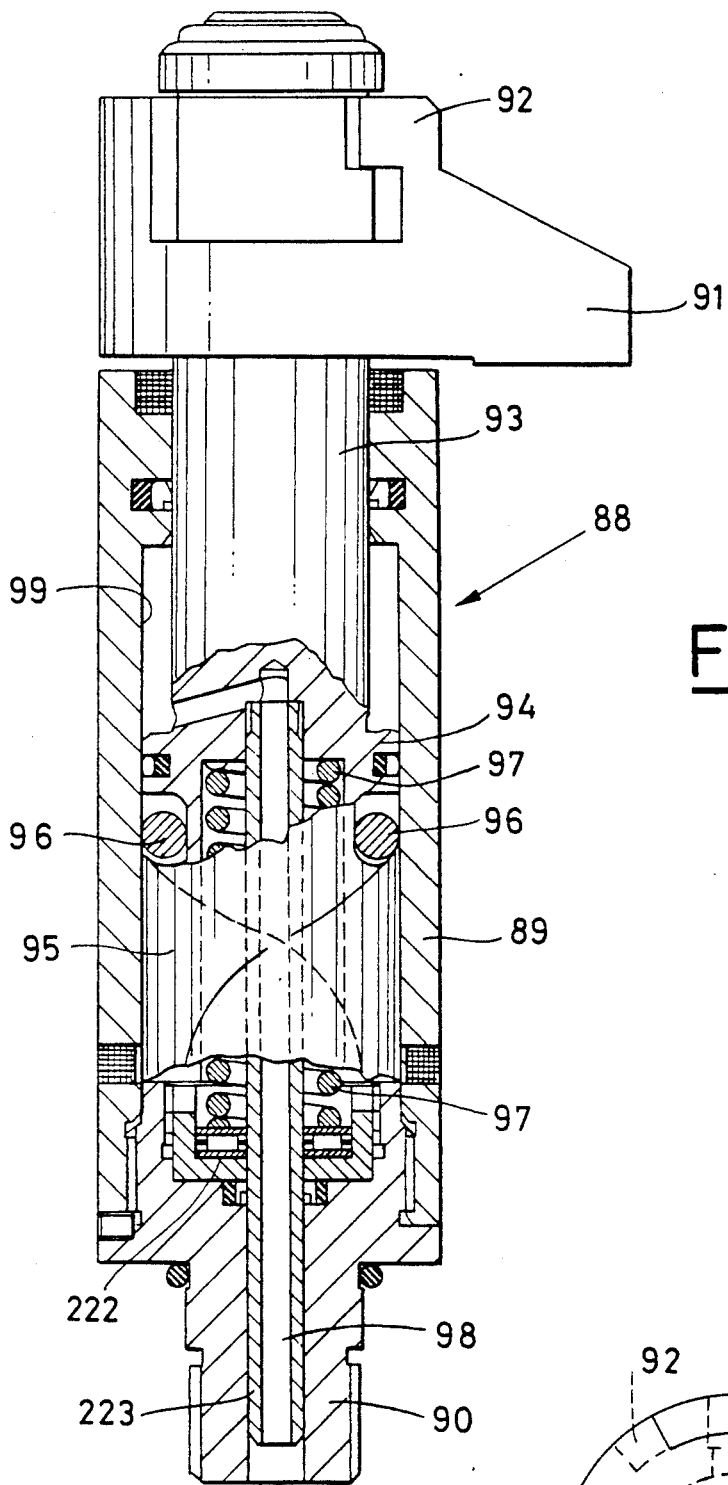
FIGS. 21 and 22 show another modular component of a clamping fixture, in an axial cross-sectional view and in a plan view taken from above, respectively.
Figure 22:
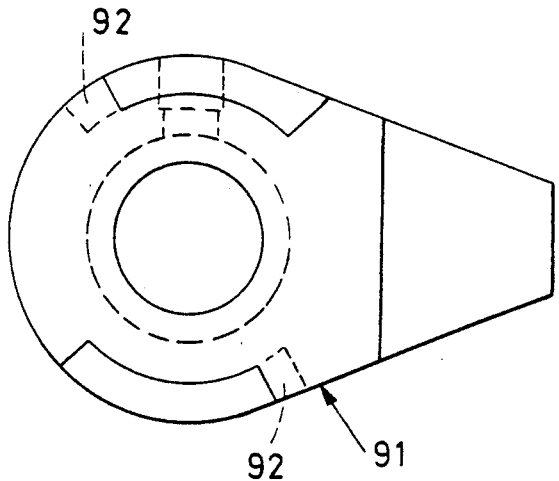

FIGS. 21 and 22 illustrate a modular clamping element 88, which comprises a hollow cylindrical casing 89 provided with a lower threaded tang 90 having a diameter suitable for threading into the internal hole 29 of an anchoring element 19 of pallet 5. Above the hollow casing 89, there is provided a clamping bracket 91 having protuberances 92 which may be engaged with teeth 64 of robot 13. From clamping bracket 91, there extends downward a cylindrical stem 93, which, after an intermediate piston-shaped part 94, forms a part having a helical surface 95 engaged with cylindrical pins 96 integral with casing 89. A spring 97, resting against the thrust bearing 222, pushes upwards piston 94 and thus clamping bracket 91. A hole 98 obtained axially in a small cylindrical rod 223 passing through the threaded tang 90, the part with helical surface 95 and the piston 94 allows the feeding of oil or other fluid into an anular chamber 99 above piston 94 so as to overcome the force of spring 97 and arrange the component in the operative clamped position shown in FIG. 21.

Figure 23:
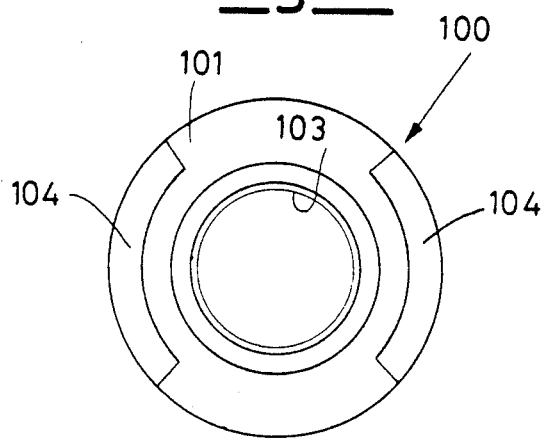
FIGS. 23 and 24 show yet another modular component of a clamping fixture, in a plan view taken from above and in an axial cross-sectional view, respectively.
Figure 24:
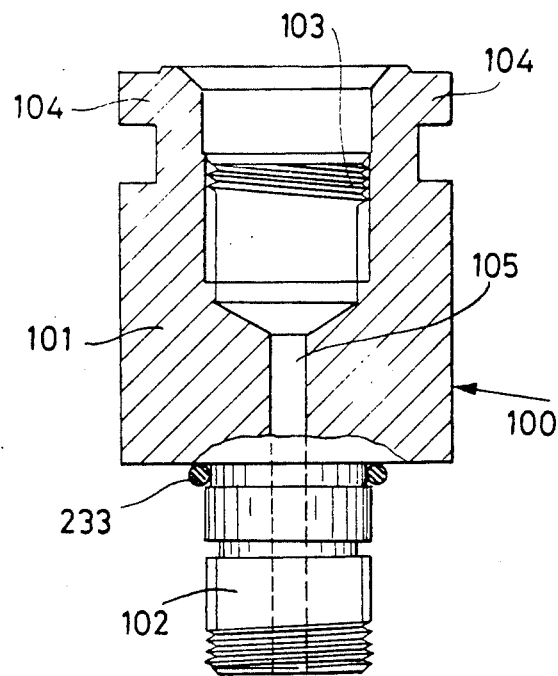

FIGS. 23 and 24 illustrate an intermediate modular component 100, which may be placed in any number between an anchoring element 19 and one or the other of the uppermost components 82 and 88. The component 100 is formed by an essentially cylindrical casing 101 provided with a lower externally-threaded tang 102 having a hydraulic gasket 233 and an upper axial hole 103 which is partially and internally threaded, suitable for screwing into internal hole 29 of an anchoring element 19 of pallet 5 and for receiving the lower threaded tang 84 of a positioning component 82 or the lower threaded tang 90 of a clamping component 88 or the tang 102 of an analogous intermediate component 100, respectively. Protuberances 104, analogous to those provided for in components 82, 88 or 100 and in plugs 31, are present in the upper extremity of cylindrical casing 101. An axial hole 105 passes through the entire component 100, to allow the passage of oil or other fluid toward the component 82, 88 or 100 above.

Figure 26:
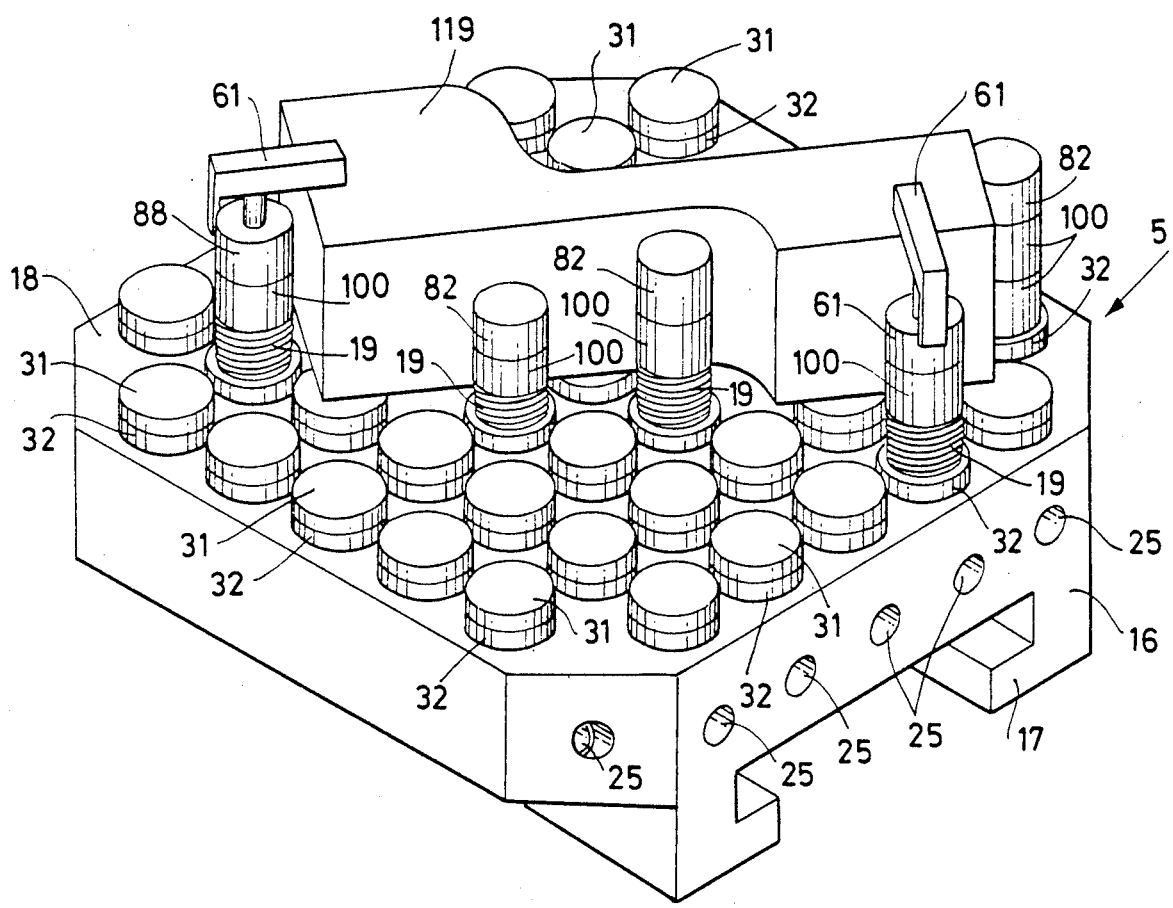
FIG. 26 shows in a perspective view the pallet of FIG. 2 in a condition equipped with a clamping fixture holding a rough piece to be machined.

The modular components 82, 88 and 100 of FIGS. 19 to 24, and many others which absolve reference and/or clamping functions and which have in common with those described the lower threaded tang and the upper protuberances so as to be compatible with the same pallet and with the same robot, are variably combinable with one another and with anchoring elements 19 suitably adjusted in height and in angular orientation to accomplish the positioning and the clamping of a rough piece 119 on pallet 5, as shown in FIG. 26.

Figure 25:
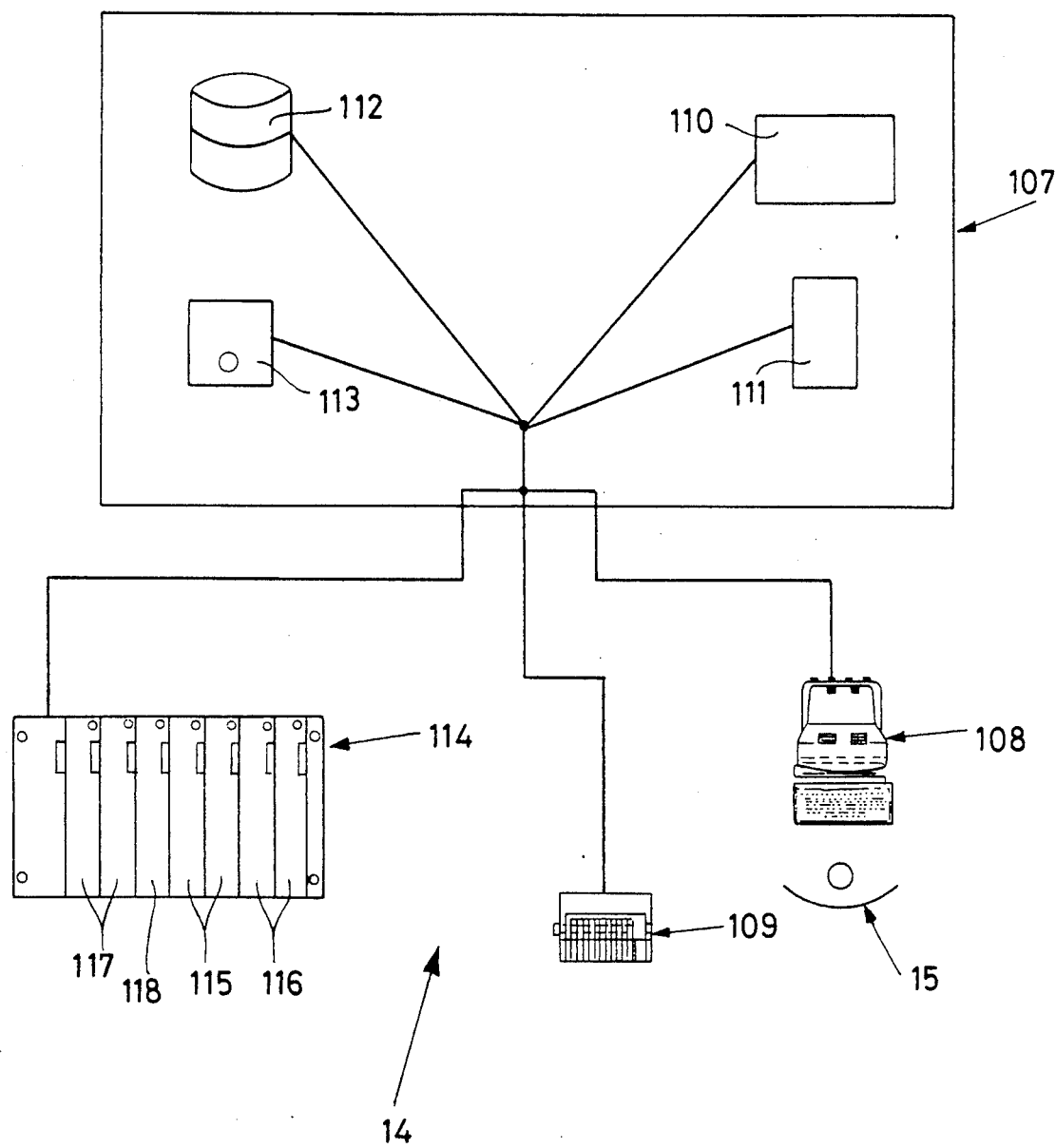
FIG. 25 shows the diagram of the principles of a possible control centre which may be used in the station of FIG. 1.

This, as well as the adjustment of anchoring elements 19 of pallet 5, is executed by robot 13 in a manner which will be explained later, and under the control of control centre 14 illustrated in FIG. 25.

The control centre comprises a programmable computer 107 provided with a console 108 which allows the introduction of data on the part of the operator 15 and the display of the computer's answering messages, as well as a printer 109 for printing the messages on paper.

The computer 107, basically a normal computer available on the market, comprises a central processing unit (CPU) 110, a random access operating memory (RAM) 111, a hard disk 112 on which the operating system and the stations's operating program are stored, and a writing-reading unit 113 for magnetic disks.

To the computer 107, there is connected an electrical cabinet 114, which contains input data boards 115, output data boards 116, boards 117 for controlling the electrical axes of robot 13 and board 118 for controlling the oleodynamic axis of table 7.

Using the control centre 14, the operator 15 can program and cause to be executed the cycles of clamping assembly and disassembly of a rough piece on a pallet similar to that of FIG. 2.

The movements of revolving table 7, of robot 13 and of testing device 8 to be executed on the occasion of the first assembly of a clamping fixture, are activated by the operator by means of suitably developed macroinstructions. When the operator activates a macroinstruction, this is interpreted by the operating program of computer 107, stored on the hard disk 112 and moved to the operating RAM 111, and converted into individual movements in the execution sequence controlled by the CPU 110. The execution commands of these movements, at the output of the computer 107, are transformed or enhanced by the boards 115 or 116, or by the boards 117 and 118 when the movement in question refers to a numerically controlled axis.

Using such macroinstructions, once an empty pallet 5 with all the anchoring elements 19 closed by plugs 31 has arrived on table 7 and has been clamped on it in the assembly position, the operator causes table 7 to be inclined and rotated until the pallet support face which is to receive the rough piece as well as the clamping fixture is horizontal and facing upward.

With the jib crane 10, the operator then places a sample rough piece 119 on the supporting face of the pallet. Using his or her experience, the operator studies both the rough piece and the final piece to be accomplished and decides on the anchoring element 19 onto which to place the first component of the clamping fixture. He or she then orders robot 13 to remove the first plug 31 according to the way described with reference to FIGS. 15 to 18 and to adjust the height and angular orientation of the corresponding anchoring element. This latter operation is executed by engaging teeth 64 of tubular-shaped grasping organ 63 with notches 33 of locking ring nut 32, then again engaging the lower star-shaped extremity 66 of the finger-shaped grasping element 65 with the corresponding star-shaped cross-section 34 of internal hole 29 of the anchoring element to cause the latter's rotation and its consequent adjustment of height and of angular orientation, and lastly also tightening again ring nut 32 with teeth 64 of grasping organ 63.

Subsequently, the operator orders robot 13 to open a selected drawer 56 of magazine 12 to withdraw a desired modular component 82, 88 or 100. The opening of the drawer is executed by engaging the finger-shaped grasping organ 65 of robot 13 with handle 57 of the selected drawer, which has a vertical hole suitable for receiving without any interference the lower extremity of said finger-shaped organ. Once the drawer is open, robot 13 engages with teeth 64 the protuberances 85, 92 or 104 of the desired modular component 82, 88 or 100 and presses its top with extremity 66 pushed downward by piston 67 subsequently extracting the component from the drawer and translating it over the anchoring element 19 just prepared. When it reaches this point, the robot screws the component onto the anchoring element.

If the component thus applied is a positioning component 82 or a clamping component 88, the operation on that anchoring element is finished and the operator can proceed to a subsequent anchoring. If, however, it is an intermediate component 100, the robot is ordered to repeat the operation with one or more other components 100 up to a list component 82 or 88. Component by component, the entire clamping fixture is thus assembled.

During assembly, when the presence of the rough piece 119 on pallet 5 prevents the assembly of a component by robot 13, the operator stops the robot and removes the rough piece from the pallet before starting up the robot again. When, on the other hand, the presence of the rough piece facilitates the operator's decision regarding the configuration of the clamping fixture, the operator stops the robot and places the rough piece on the pallet again.

Still during assembly, through the internal holes of anchoring elements 19 with no plug 31, as well as through those of intermediate components 100, the fluid present in channels 25 of the pallet overflows continuously toward the outside; this is useful so as to avoid the necessity of a final bleeder for the hydraulic circuit and to avoid the entry of dirt. The fluid used for this purpose in an emulsion of oil and water used in the machine tool, on which the pallet carrying the clamping fixture will be carried, to lubricate and cool the tool during chip removal. The use of the same fluid for the clamping and for the cooling functions eliminates all problems of tightness and unifies the recovery circuit for the fluid itself.

Once the assembly of the fixture is completed, the operator arranges a sample rough piece 119 on pallet 5 and executes its clamping by means of the clamping components 88 of the fixture itself. This is obtained by feeding the fluid, directly or through hole 105 of an intermediate component 100, in axial hole 98 of the clamping components until it reaches annular chamber 99, where it pushes piston 94 downward against the action of spring 97. Consequently, the clamping bracket 91 is lowered and, due to part 95 having a helical surface, it simultaneousely rotates until it comes into close clamping contact with the upper face of the rough piece.

The pallet 5 with the rough piece 119 and the clamping fixture just assembled assumes, at this point, a configuration of the type shown in FIG. 26.

By means of further macroinstructions, the operator orients table 7 and translates the testing device 8, subsequently activating cylinder 52 so as to press with the latter's stem 53 onto the rough piece. With a position sensor (not shown) he or she checks that the deformation of the clamping fixture and of the rough piece are within the desired limits.

Meanwhile, computer 107 has memorized all the instructions issued by the operator in sequence to the robot, to the revolving table and to the testing device and associates them with the piece's code. It memorizes them on hard disk 112 and on the magnetic disk which the operator has previously inserted in the writing-reading unit 113.

In this way, if other analogous fixtures are required, the operator will key-in the piece's code and, under the control of the computer alone, the robot will once again perform the prior assembly and the necessary test. Storing on magnetic disk allows quick recovery of the instructions in case of breakages of the hard disk 112.

Once the pallet has been provided with all the required fixtures and the corresponding tests have also been carried out, the pallet itself is made to exit from the assembly station and is transferred to the conveyancing system 6, which moves it to a station for loading and unloading the rough pieces, which is provided with an oleodynamic coupling compatible with the inlet hole 26. This is where the loading of the different pieces to be machines occurs, as well as that of the sample already assembled, with respective ungrasping and grasping of the clamping fixture, and the loaded pallet is sent to be machined.

When all the pieces which are the same as that for which the clamping fixture has been designed have been machined and the fixture itself is thus no longer of any use, the pallet which is by now empty and washed is made to return to station 1, where it is clamped onto the revolving table 7. Under the control of computer 107, robot 13 strips the pallet and automatically executes backwards all the operations previously executed for assembly and stored in the computer, placing as it goes along, in the drawers of the magazine 12, the different dismantled components.

It may happen that in an unscrewing operation of a part of a fixture having several superimposed components, the robot takes away more than one of these components instead of just the uppermost one. To obivate this drawback, a photocell system may be provided, which senses the height of the removed component or assembly and, if this is greater than that of the individual desired component, it orders the robot to move to a preset position where, manually or mechanically, the separation is executed of the components which are screwed together.

Each time that, in the future, there will be the requirement of preparing a pallet for machining a new lot of the same pieces, or if several equally equipped pallets will be required simultaneously, the operator will recall the piece's code and the robot will automatically execute all the operations required for preparing the desired pallet, with no need for further human actions or decisions. Testing with the device 8 will automatically follow.

I claim:

1. Apparatus for assembling workpiece clamping fixtures to a workpiece support pallet and for disassembling said workpiece clamping fixtures from said workpiece support pallet,
said apparatus comprising:
a base pedestal;
a table revolvably supported on said base pedestal;
means for removably mounting on said table a pallet which has a support face provided with a two-dimensional array of adjustable anchoring elements;
a magazine for storing a supply of clamping fixture modules demountably mountable directly or via one another to respective ones of said adjustable anchoring elements;
a programmable robot having grasping organ means operating between said table and said magazine, for adjusting said adjustable anchoring elements, for grasping and transferring said clamping fixture modules between said magazine and said adjustable anchoring elements, and for applying said clamping fixture modules directly or indirectly to and separating said clamping fixture modules directly or indirectly from said adjustable anchoring elements; and
a control center for programming said robot by example, to respetitively adjust anchoring elements and mount and demount clamping fixture modules to or from a succession or like pallets successively mounted on said table; said control center comprising an electronic computer operatively connected with said robot and arranged to be operated by a sole operator.

2. The apparatus of claim 1, further comprising:
a device movably supported on said base for disengageable engagement with a workpiece when a workpiece is clamped by a plurality of said clamping fixture modules installed by said robot on a respective said pallet, for testing whether said workpiece is thereby securely clamped to said pallet.

3. The apparatus of claim 1, wherein: said table is revolvably supported on said base pedestal by support means including:
an inclinable part hinged by hinge means to said base pedestal for rotation about a horizontal axis;
means for controlling rotation of said inclinable part about said horizontal axis;
a rotatable part supported by said inclinable part for rotation about a vertical axis;
control means for rotating said rotatable part;
clamping means for clamping said rotatable part at a desired spatial disposition;
an upper plate provided with guides for removably receiving and positioning a pallet; and
means for clamping said upper plate and thereby a pallet received and positioned thereon, with respect to said rotatable part.

4. The apparatus of claim 1, wherein:
said magazine comprises at least one row of caissons having sliding drawers provided with handles arranged to be engaged by said grasping organ means of said robot for opening and closing respective ones of said drawers; and guide means provided between said drawers and said robot for allowing spatial movement between said robot and said drawers so that said robot may access a plurality of said drawers.

5. The apparatus of claim 1, wherein:

said robot comprises an operating device arranged to be moved along three mutually perpendicular axes and including a tubular casing;

said grasping organ means including:

a first tube-shaped grasping organ rotatably housed in said tubular casing and provided with protruding terminal grasping elements arranged to engage with said clamping fixture modules, and with first portions of said adjustable anchoring elements;

a second finger-shaped grasping organ rotatably and axially slidably housed in said first tube-shaped grasping organ and provided with protrudable terminal grasping elements arranged to engage with second portions of said adjustable anchoring elements for adjusting said second portions relative to said second portions; and means for operating said first and second grasping organs.

6. The apparatus of claim 1, wherein:

said magazine comprises at lease one row of caissons having sliding drawers provided with handles arranged to be engaged by said grasping organ means of said robot for opening and closing respective ones of said drawers;

guide means provided between said drawers and said robot for allowing spatial movement between said robot and said drawers so that said robot may access a plurality of said drawers;

said robot comprises an operating device arranged to be moved along three mutually perpendicular axes and including a tubular casing;

said grasping organ means including:

a first tube-shaped grasping organ rotatably housed in said tubular casing and provided with protruding terminal grasping elements arranged to engage with said clamping fixture modules, and with first portions of said adjustable anchoring elements;

a second finger-shaped grasping organ rotatably and axially slidably housed in said first tube-shaped grasping organ and provided with protrudable terminal grasping elements arranged to engage with second portions of said adjustable anchoring elements for adjusting said second portions relative to said second portions; said terminal grasping elements of said second finger-shaped grasping organ ar further configured for engaging said handles of said drawers for opening and closing said drawers; and means for operating said first and second grasping organs.

7. The apparatus of claim 1, further comprising:

a supply of said clamping fixture modules comprising at least one solid substantially cylindrical vertically oriented casing provided with a lower threaded tang arranged to be threaded into a respective said adjustable anchoring element.

8. The apparatus of claim 1, further comprising:

a supply of said clamping fixture modules comprising at least one hollow substantially cylindrical casing having a threaded tang arranged to be engaged in a respective said adjustable anchoring element; a piston slidably and rotatably housed in said hollow casing; a clamping bracket integral with said piston; elastic means for urging said piston towards a raised position corresponding to deactivation of said clamping bracket; hydraulic means operable by engagement one of said pallet and a said adjustable anchoring element, for displacing said piston to a lowered position corresponding to activation of said clamping bracket; and means for rotating said piston, and thereby said clamping bracket, upon axial displacement of said piston.

9. The apparatus of claim 1, further comprising:

a supply of said clamping fixture modules comprising at least one module arranged to clamp against a workpiece; and at least one intermediate module arranged to mount said one module to a respective said adjustable anchoring element.

* * * * *